(12) United States Patent
Buckhouse et al.

(10) Patent No.: US 6,968,933 B2
(45) Date of Patent: Nov. 29, 2005

(54) SELECTABLY ENGAGEABLE CLUTCH FOR A DEVICE

(75) Inventors: Norman Buckhouse, Dublin, GA (US); Michael Scott, Dublin, GA (US)

(73) Assignee: Electrolux Home Products, Inc., Cleveland, OH (US)

( * ) Notice: Subject to any disclaimer, the term of this patent is extended or adjusted under 35 U.S.C. 154(b) by 0 days.

(21) Appl. No.: 10/462,990

(22) Filed: Jun. 17, 2003

(65) Prior Publication Data

US 2004/0256191 A1    Dec. 23, 2004

(51) Int. Cl.[7] .............................................. F16D 11/10
(52) U.S. Cl. ............... 192/69.4; 192/69.62; 192/114 R
(58) Field of Search .................... 192/69.62, 69.61, 192/69.71, 69.4, 49, 99 S, 114 R; 74/529, 74/532; 180/6.2, 19.3, 332

(56) References Cited

U.S. PATENT DOCUMENTS

| | | | | |
|---|---|---|---|---|
| 510,227 | A | * | 12/1893 | Acklin ..................... 192/69.71 |
| 670,571 | A | * | 3/1901 | Weaver ........................ 74/537 |
| 1,579,206 | A | * | 4/1926 | Helmer ................... 192/114 R |
| 3,187,867 | A | * | 6/1965 | Sink .......................... 192/89.26 |
| 3,251,630 | A | * | 5/1966 | Astley ...................... 192/69.62 |
| 3,489,255 | A | * | 1/1970 | Gatewood ................ 192/89.26 |
| 3,811,524 | A | * | 5/1974 | Aldred ....................... 180/19.3 |
| 4,783,915 | A | | 11/1988 | Sasaki et al. |
| 4,834,228 | A | | 5/1989 | Horsch |
| 4,858,739 | A | | 8/1989 | Nemoto |
| 5,018,592 | A | | 5/1991 | Buchdrucker |
| 5,438,770 | A | | 8/1995 | Miller |
| 5,752,373 | A | | 5/1998 | Cappo et al. |
| 5,915,487 | A | | 6/1999 | Splittstoesser et al. |
| 6,363,630 | B1 | | 4/2002 | Ziegler |

FOREIGN PATENT DOCUMENTS

JP        61-41626   A   *   2/1986

* cited by examiner

*Primary Examiner*—Rodney H. Bonck
(74) *Attorney, Agent, or Firm*—Pearne & Gordon LLP

(57) ABSTRACT

A clutch assembly selectively transfers rotational energy from a rotatable drive shaft to a wheel. The clutch assembly includes a drive transmitting member rotationally coupled to the drive shaft, a clutch member rotationally coupled to the drive transmitting member and movable relative to the drive transmitting member, and a wheel drive member adapted to receive a rotational energy from the clutch member. In one aspect, the clutch assembly is for selectively transmitting drive force from a rotational drive source to a single wheel of a multi-wheeled power driven device. The clutch assembly includes a member axially movable relative to the rotational drive source to transmit rotational energy toward the wheel when the member is in one axial position.

14 Claims, 4 Drawing Sheets

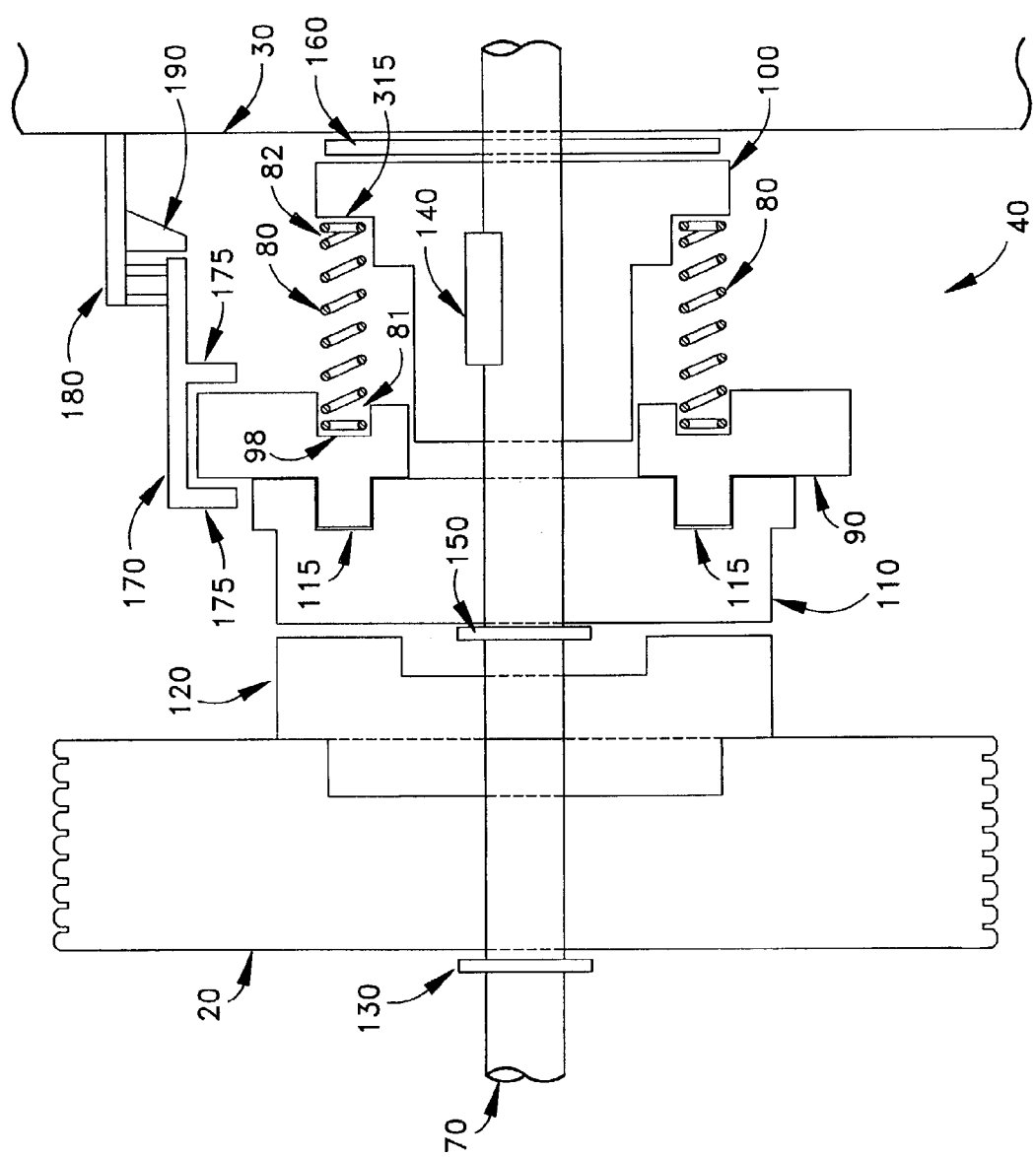

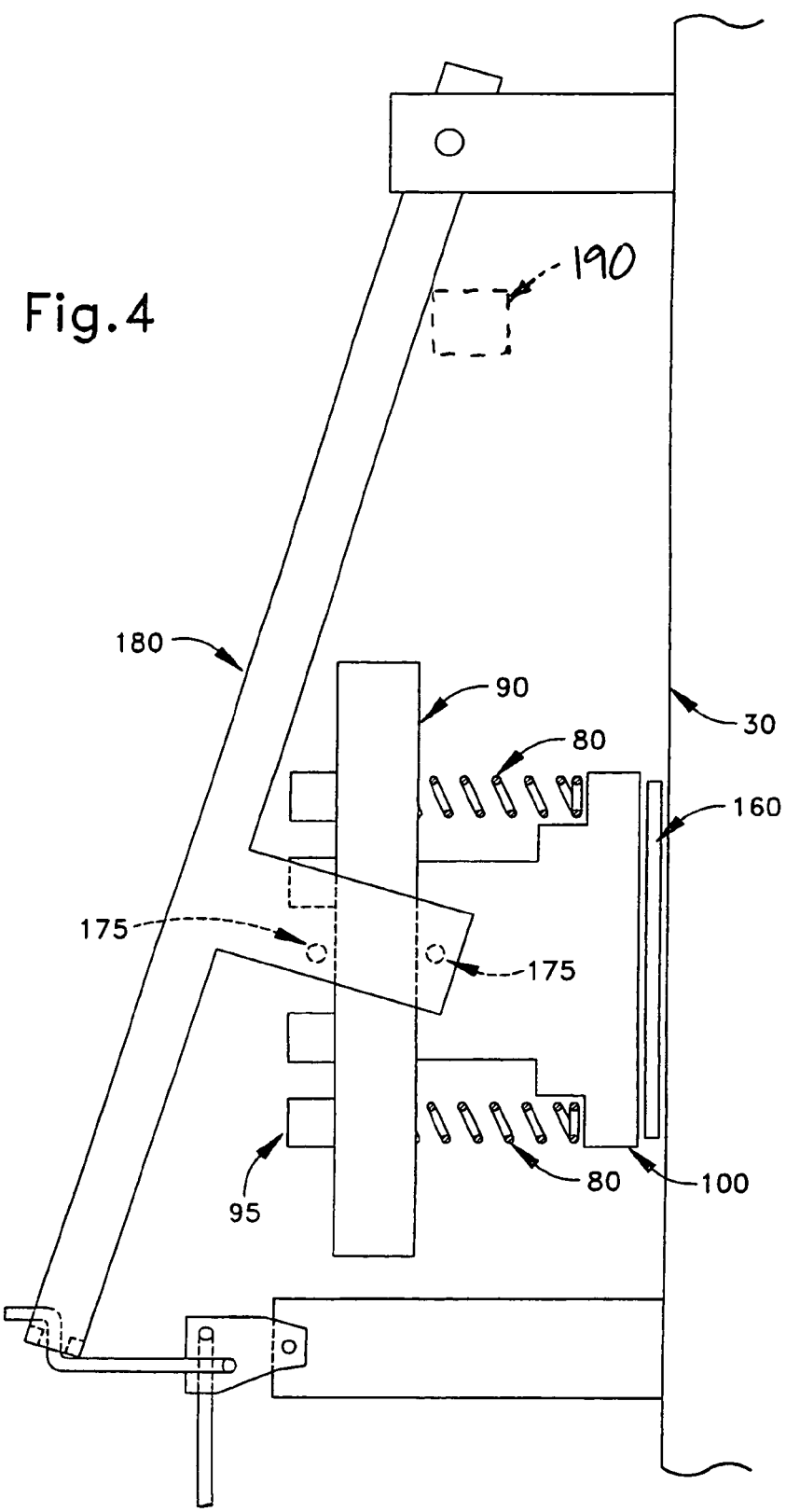

SELECTABLY ENGAGEABLE CLUTCH FOR A DEVICE

FIELD OF THE INVENTION

The present invention relates to clutches, and more particularly the present invention relates to a selectably engageable clutch for a driven device.

BRIEF DISCUSSION OF THE RELATED ART

Cutting grass and blowing snow, for example, are activities facilitated by the use of certain self-powered devices, such as grass cutters and snow blowers. These devices typically include one or more wheels and may include a drive source for providing a propulsive force to the wheels, thus reducing the need for a user to push the device. To use the device, a user must actuate the necessary components of the device and orient the same along a desired direction. This orientation generally involves the user manually turning the device. Because these devices typically do not include articulated wheel-axle joints, there is no steering wheel-like mechanism to facilitate the orientation. Thus, the entire device must physically be moved or turned.

These devices contain many attributes that make such physical moving problematic. For example, these devices can be very heavy, thus placing stress on the user attempting to steer the device. Also, these devices are operated under conditions that make such physical moving difficult. For example, snow throwers may be used in an area covered by a deep layer of snow. As the snow thrower progresses through the snow, manual movement is impeded by surrounding barriers of snow. Thus, there exists a need for the facilitated orienting of such example devices.

SUMMARY OF THE INVENTION

In accordance with one aspect, the present invention provides a clutch assembly for selectively transferring rotational energy from a rotatable drive shaft to a wheel. The clutch assembly includes a drive transmitting member rotationally coupled to the drive shaft, a clutch member rotationally coupled to the drive transmitting member and movable relative to the drive transmitting member, and a wheel drive member adapted to receive a rotational energy from the clutch member.

In accordance with another aspect, the present invention provides a clutch assembly for selectively transmitting drive force from a rotational drive source to a single wheel of a multi-wheeled power driven device. The clutch assembly includes a member axially movable relative to the rotational drive source to transmit rotational energy toward the wheel when the member is in one axial position.

In accordance with another aspect, the present invention provides a device that includes a clutch assembly for selectively transferring rotational energy from a rotatable drive shaft to a wheel. The clutch assembly includes a drive transmitting member rotationally coupled to the drive shaft, a clutch member rotationally coupled to the drive transmitting member and movable relative to the drive transmitting member, and a wheel drive member adapted to receive a rotational energy from the clutch member.

In accordance with another aspect, the present invention provides a clutch assembly comprising means for preventing undesirable axial movement of a clutch member to a position where the clutch member does not transfer rotational energy to a wheel drive member.

BRIEF DESCRIPTION OF THE DRAWINGS

The foregoing and other features and advantages of the present invention will become apparent to those skilled in the art to which the present invention relates upon reading the following description with reference to the accompanying drawings wherein:

FIG. 3 is a view similar to FIG. 2, but shows the engageable clutch in another position.

FIG. 4 is a schematic top view of a lever for use with the engageable clutch.

DISCUSSION OF THE EXAMPLE EMBODIMENT

Figure 1:
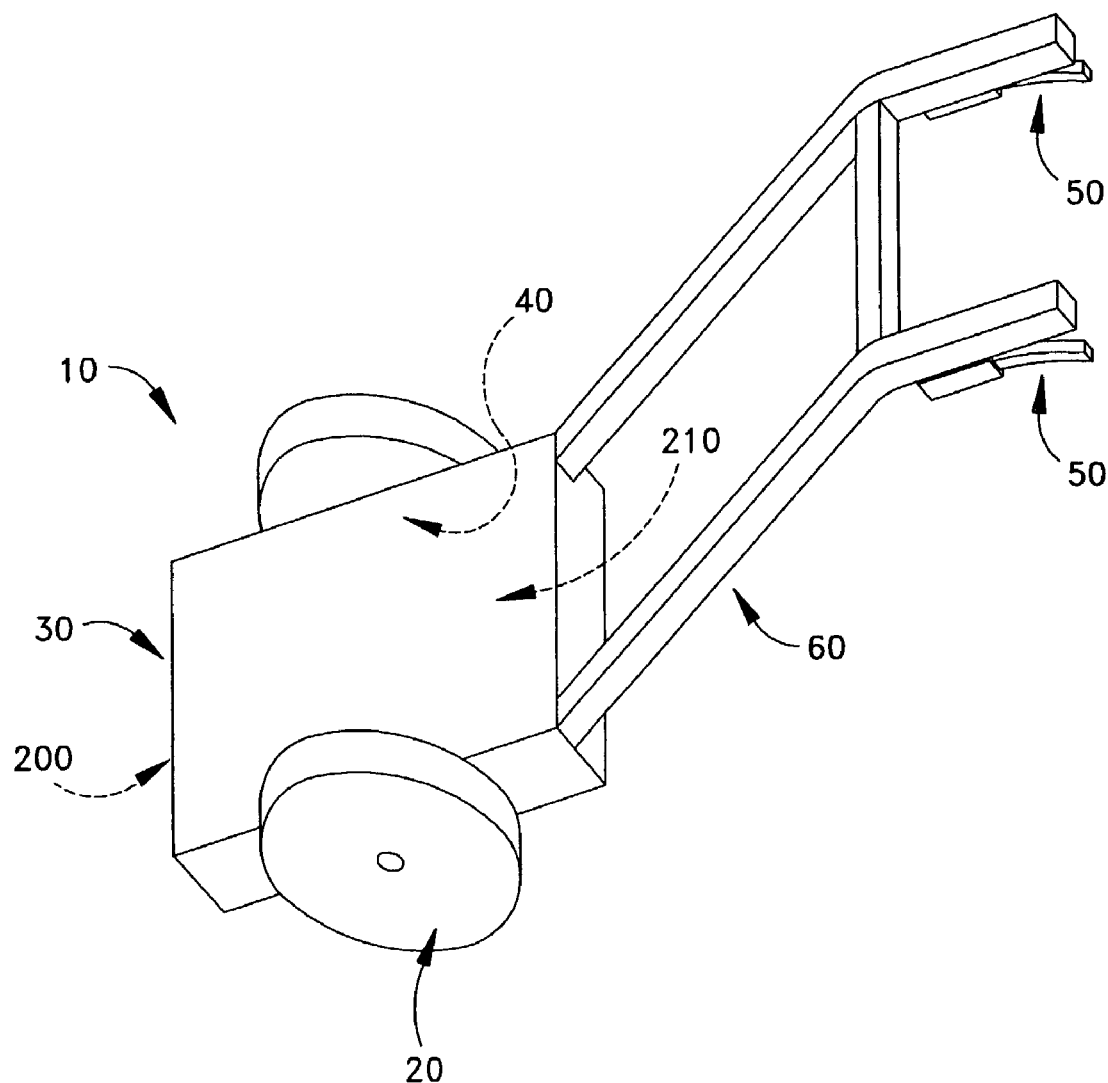
FIG. 1 is a schematic perspective view of an example device having a selectively engageable clutch, as for example shown in FIG. 2 and according to the present invention.

In accordance with an example embodiment, the present invention provides a selectably engageable clutch assembly 40 (FIG. 2) and a device 10 (schematically shown in FIG. 1) having the selectably engageable clutch assembly 40 utilized therein. The device 10 (FIG. 1) according to the present invention may be any device having one or more wheels and may include structure for performing a desired function. Such a device 10 may be a grass cutter, snow thrower, etc., and FIG. 1 shown structure of the device in only the most basic schematic form. It is to be understood that these devices are for example only and that the clutch 40 is applicable to other types of devices.

With reference to FIG. 1, the device 10 includes a housing 30, one or more wheels 20, and handle bars 60. The housing 30 generally includes operative elements, such as an environmental interface 200, a drive source 210 and drive elements. The environmental interface 200 performs the desired functions of the device 10, such as grass cutting and snow throwing, etc., and may include grass cutting components, snow throwing components, etc. The drive source 210 provides a propulsive force for the device 10 and may be an engine or other apparatus sufficient to provide the propulsive force. It is to be understood that the device 10 may be provided with plural drive sources 210.

Figure 2:
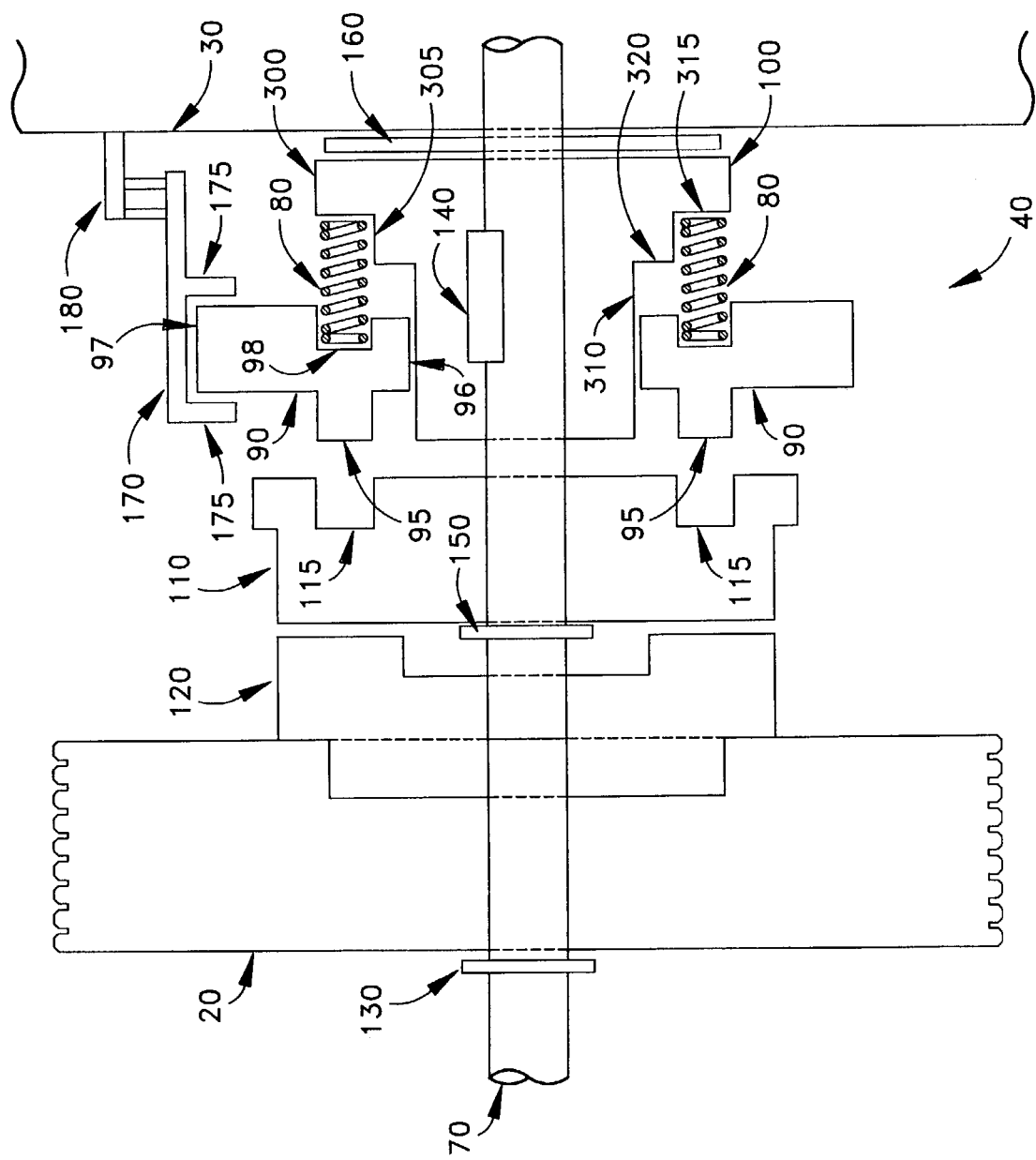
FIG. 2 is a cross-sectional view of the engageable clutch for use in the example device of FIG. 1, and shown in one position.

The drive elements provide structure for cooperation between the drive source 210 and the wheels 20. With reference to FIGS. 2 and 3, example drive elements generally include a drive shaft 70 and the clutch assembly 40. The drive shaft 70 may be in communication with the drive source 210 and be adapted to transfer the propulsive force from the drive source 210 to the wheels 20 or the clutch assembly 40 or both. In one example, the drive shaft 70 transfers propulsive force directly to the wheels 20. In an alternative example, the drive shaft 70 transfers the propulsive force to the clutch assembly 40, wherein the clutch assembly 40 may then selectively transfer the propulsive force to the wheels 20. The drive shaft 70 may communicate with the drive source 210 through conventional means.

With further reference to FIGS. 2 and 3, an example of the clutch assembly 40 is illustrated. The clutch assembly 40 is adapted to selectively transfer the propulsive force from the drive shaft 70 to the wheels 20 by the engagement and disengagement of several components, a discussion of which components now follows. An example of the clutch assembly 40 includes an axle lobe 100, a movable clutch 90, a spring 80, a wheel lobe 110 and a wheel driver 120.

An example of the axle lobe 100 is shown as a generally cylindrical member that is engaged with the drive shaft 70 and is rotationally coupled to the drive shaft 70, through, for example, an anchor 140. The axle lobe 100 includes, as a unitary construction, a plurality of cylindrical members, such as a first cylinder 300, a second cylinder 305 and a third cylinder 310. The first cylinder 300 may have the largest diameter of the cylinders 300, 305, 310 and either abuts the housing 30, or is engaged with the housing 30 in a spaced apart relationship with a washer 160 being provided between the housing 30 and the axle lobe 100. It is to be understood that the other arrangements regarding location of the axle lobe 100 and clutch assembly 40 are possible and that the present invention is not intended to be limited to the clutch assembly 40 being arranged on the outside of the housing 30; for example, the clutch assembly 40 may be contained within or partially within the housing 30.

The second cylinder 305 is provided at a surface of the first cylinder 300 distal to the housing 30. The first cylinder 300 and the second cylinder 305 cooperate to define a first surface 315, aspects of which will be described hereinafter. The third cylinder 310 is provided at a surface of the second cylinder 305 distal to the housing 30 and cooperates with the second cylinder 305 to define a second surface 320, aspects of which will be described hereinafter.

The movable clutch 90 is an annular ring-like member movably engaged with the axle lobe 100. In an example embodiment, the movable clutch 90 is movably engaged with the third cylinder 310 of the axle lobe 100. The movable clutch 90 includes an inner annular surface 96 that may be engaged with the axle lobe 100 and an outer annular surface 97, aspects of which will be described hereinafter. The movable clutch 90 further includes a recessed portion 98 and a projecting portion 95, aspects of both of which will be described hereinafter. The movable clutch 90 is adapted to move relative to the axle lobe 100 and may be slidably engaged with the same. The movable clutch 90 may directly contact the axle lobe 100 or may be engaged with the axle lobe 100 in a spaced apart relationship.

The clutch assembly 40 further includes the spring 80 for biasing the movable clutch 90 toward the wheel 20. The spring 80 includes a first end 81 and a second end 82. The first end 81 is engaged with the recessed portion 98 of the movable clutch 90; the second end 82 is engaged with the first surface 315 of the axle lobe 100. It is to be understood that the recessed portion 98 and the first surface 315 may be provided with structure necessary to maintain the spring 80 in an engaged relationship, including structure for retaining the same.

With reference to FIGS. 2 and 3, the clutch 40 further includes the wheel lobe 110 and the wheel driver 120, both of which are rotationally decoupled from the drive shaft 70. The wheel lobe 110 is a generally cylindrical member arranged in the clutch 40 at a location distal to the axle lobe 100 and in proximity to the third cylinder 310 of the axle lobe 100. The wheel lobe 110 includes recessed portions 115 adapted to interact with the projecting portion 95 of the movable clutch 90, and further includes structure for communicating with the wheel driver 120. The wheel lobe 110 is retained in the clutch 40 by an anchor 150. The wheel driver 120 directly communicates with the wheel 20 and contains structure for communicating with the wheel lobe 110. The function and operation of the wheel lobe 110 and the wheel driver 120 will be discussed below.

The clutch 40 may further include a lever 170 for engaging the movable clutch 90. The lever 170 includes at least one tooth 175 for engaging the movable clutch 90 near the outer surface 97 of the movable clutch 90. With reference to FIG. 2, in an example arrangement, the teeth 175 are arranged around the outer surface 97 of the movable clutch 90 and are adapted to move the movable clutch 90 along an axis generally parallel to the longitudinal axis of the drive shaft 70. In one example embodiment, the movement of the lever 170 is controlled by a user interface 50, such as finger levers, mounted on the handle bars 60. It is to be understood that various other constructions and components are possible for controlling the movement of the lever 170.

The clutch assembly 40 is retained on the drive shaft 70 by an anchor or retaining ring 150. The retaining ring 150 operates to counter the force supplied by the spring 80 and maintains the clutch assembly 40 on the drive shaft 70 and further maintains the clutch assembly 40 in an appropriately spaced relationship.

The wheel 20 is retained on the drive shaft 70 by an anchor or link pin 130. The link pin 130 operates to position the wheel along an axis generally parallel to the longitudinal axis of the drive shaft 70 wherein the wheel 20 communicates with the wheel driver 120 and is rotationally decoupled from the drive shaft 70.

According to an example embodiment of the present invention, the device 10 may have a plurality of wheels 20, such as a left wheel and a right wheel. It is contemplated that the device 10 may be provided with a finger lever 50 mechanically engaged with each clutch assembly 40. Thus, according to one embodiment, the device 10 will be provided with a left clutch assembly engaged with the left wheel, a right clutch assembly engaged with the right wheel, a left finger lever engaged with the left clutch assembly, and a right finger lever engaged with the right clutch assembly. Because each wheel may have a clutch assembly, each wheel may operate independently of the other wheel, thus facilitating steering of the device 10. For example, if the user desires to steer the device 10 along a left direction, relative to the direction along which the device 10 is traveling, the user would actuate the left finger lever, which actuation would cause the clutch assembly engaged with the left wheel to disengage. As the clutch assembly is disengaged, propulsive force will no longer be applied to the left wheel. Because the left wheel lobe, wheel driver and wheel are rotationally decoupled from the drive shaft 70, the left wheel will continue to turn as the device 10 moves, but the left wheel will not be receiving the propulsive force. Because the left wheel will not be receiving the propulsive force, it will rotate at a slower speed than the speed at which the right wheel is rotating. Because of the rotational speed differential, the device will be caused to orient itself along a left direction. When the desired orientation is achieved, the user will release the left lever, which releasing will cause the movable clutch to re-engage with the wheel lobe, thus returning the propulsive force to the left wheel.

The principle of operation of the clutch assembly 40 will now be discussed. In a normal operating state, as shown in FIG. 3, the clutch assembly 40 is in an engaged arrangement, i.e., propulsive force from the drive source 210 is being transferred by the clutch assembly 40 to the wheel 20. The drive source 210 is activated and provides a force to the drive shaft 70, thus rotating the drive shaft 70. As the drive shaft 70 rotates, the axle lobe 100 rotates, because the axle lobe 100 is rotationally coupled to the drive shaft 70 through the anchor 140. The spring 80 is coupled to the axle lobe 100 through interaction between the spring 80 and the axle lobe 100 at the first surface 315, and thus, as the axle lobe 100 rotates, the spring 80 rotates as well. The movable clutch 90 is coupled to the axle lobe 100 through the interaction of the outer annular surface of cylinder 310 of axle lobe 100 and the inner annular surface 96 of the movable clutch 90, and thus, as the axle lobe 100 rotates, the movable clutch 90 rotates as well. In the normal operating state, the spring 80 acts on the movable clutch 90 and biases the movable clutch 90 away from the housing 30 and toward the wheel lobe 110. When the movable clutch 90 is so biased, the projecting portion 95 of the movable clutch 90 is engaged with the recessed portion 115 of the wheel lobe 110. The interaction between the projecting portion 95 and the recessed portion 115 may be of a lock-and-key configuration. Thus, as the movable clutch 90 rotates, the wheel lobe 110 rotates as well. The wheel lobe 110 contains structure that allows the wheel lobe 110 to engage the wheel drive member 120 and cause the rotation of the wheel drive member 120. Similarly, the wheel drive member 120 has structure that allows it to be engaged by the wheel lobe 110 and be rotated by the wheel lobe 110. The wheel drive member 120 is rotationally coupled to the wheel 20. Thus, as the wheel drive member 120 rotates, the wheel 20 rotates as well. Because both the wheel lobe 110 and the wheel drive member 120 are rotationally decoupled from the drive shaft 70, the forced rotation of the wheel lobe 110 and the wheel drive member 120 is dependent upon the interaction of the projecting portion 95 of the movable clutch 90 and the recessed portion 115 of the wheel lobe 110.

FIG. 2 demonstrates the clutch assembly 40 in a disengaged state. In the disengaged state, propulsive force from the drive source 210 is not applied to the wheel 20. To disengage the clutch assembly 40, the user will actuate the finger lever 50 on the handle bars 60, which actuation causes the lever 170 to move along an axis generally parallel to the longitudinal axis of the drive shaft 70. Because the lever 170 has teeth 175 that are arranged around the outer surface 97 of the movable clutch 90, the movement of the lever 170 causes movement of the movable clutch 90. In one embodiment, the movable clutch 90 is moved away from the wheel lobe 110 toward the housing 30, thus causing the projecting portion 95 of the movable clutch 90 to disengage from the recessed portion 115 of the wheel lobe 110. In this arrangement, the drive shaft 70, the axle lobe 100 and the movable clutch 90 are still rotating (assuming the drive source 210 is still in an active state), but the wheel lobe 110, wheel drive member 120 and the wheel 20 are not rotating with the drive shaft 70 because these elements are rotationally decoupled from the drive shaft 70.

In difficult conditions high rotational resistance between the wheel 20 and the drive shaft 70 creates a force generally parallel to the longitudinal axis of the drive shaft 70. This force causes movement of the movable clutch 90 in a direction parallel to the longitudinal axis of the drive shaft 70 and away from the wheel lobe 110, overcoming the bias force of spring 80 and causing the projecting portion 95 of movable clutch 90 to disengage from the recessed portion 115 of wheel lobe 110. To prevent this movement of clutch 90 when disengagement of projecting portion 95 of movable clutch 90 from recessed portion 115 of wheel lobe 110 is not desired, a restraining feature is embodied in lever 170. The teeth 175 located on lever 170 are positioned to engage movable clutch 90 on the surface facing frame 30 and on the surface facing wheel lobe 110. Teeth 175 engaging the surface of clutch 90 facing the wheel lobe 110 cause movable clutch 90 to move away from wheel lobe 110 when lever 170 is moved by user interface 50, causing disengagement of clutch 90 from wheel lobe 110. Teeth engaging the surface of movable clutch 90 that faces frame 30 operate to resist movement of movable clutch 90 that would disengage movable clutch 90 from wheel lobe 110 when this movement is not desired. A movable lock 190 is positioned to prevent movement of lever 170 when the projecting portion 95 of movable clutch 90 is engaged in recessed portion 115 of wheel lobe 110. The movement of movable lock 190 is controlled by user interface 50. When user interface 50 is used to move lever 170 and cause projecting portion 95 of movable clutch 90 to disengage from recessed portion 115 of wheel lobe 110, movable lock 190 is moved to a position that does not prevent lever 170 from moving.

Although the present invention has been described with regard to certain example embodiments, it is to be appreciated that certain modifications and alterations will be appreciated by those skilled in the art. It is contemplated that such modifications and alterations are within the scope of the present invention.

What is claimed is:

1. A drive assembly comprising:
   a rotatable drive shaft;
   a ground-engageable wheel mounted on the drive shaft and rotationally decoupled from the drive shaft with the drive shaft extending through the wheel;
   a drive transmitting member rotationally coupled to the drive shaft;
   a clutch member rotationally coupled to the drive transmitting member and movable relative to the drive transmitting member, wherein the drive shaft extends through the clutch member;
   a wheel drive member rotationally coupled to the wheel and adapted to receive rotational energy from the clutch member, the wheel drive member mounted on the drive shaft and rotationally decoupled from the drive shaft with the drive shaft extending through the wheel drive member;
   a drive receiving member mounted on the drive shaft and rotationally decoupled from the drive shaft with the drive shaft extending through the drive receiving member, wherein the drive receiving member is adapted to be engaged with the clutch member and with the wheel drive member to transfer rotational energy from the drive shaft to the wheel and wherein the drive receiving member is adapted to be disengaged from the clutch member to substantially prevent transfer of rotational energy from the drive shaft to the wheel;
   means for biasing the clutch member toward a position in which the clutch member transfers rotational energy to the wheel drive member; and
   means for moving the clutch member axially relative to the drive shaft, wherein the means for moving the clutch member is a lever.

2. The drive assembly of claim 1, wherein the means for biasing the clutch member is a spring.

3. The drive assembly of claim 1 further comprising a user interface to actuate the means for moving the clutch member.

4. The drive assembly of claim 3, wherein the user interface is a finger lever.

5. A drive assembly comprising:
   a rotatable drive shaft;
   a ground-engageable wheel mounted on the drive shaft and rotationally decoupled from the drive shaft with the drive shaft extending through the wheel;
   a drive transmitting member rotationally coupled to the drive shaft;

a member rotationally coupled to the drive transmitting member and axially movable relative to the drive shaft with the drive shaft extending through the member;

a wheel drive member rotationally coupled to the wheel and adapted to receive rotational energy from the axially movable member, the wheel drive member mounted on the drive shaft and rotationally decoupled from the drive shaft with the drive shaft extending through the wheel drive member;

a drive receiving member mounted on the drive shaft and rotationally decoupled from the drive shaft with the drive shaft extending through the drive receiving member, wherein the drive receiving member is adapted to be engaged with the axially movable member and with the wheel drive member to transfer rotational energy from the drive shaft to the wheel and wherein the drive receiving member is adapted to be disengaged from the axially movable member to substantially prevent transfer of rotational energy from the drive shaft to the wheel;

means for biasing the axially movable member toward the wheel drive member; and means for moving the axially movable member axially relative to the drive shaft, wherein the means for moving the axially movable member is a lever.

6. The drive assembly of claim 5, wherein the means for biasing the axially movable member is a spring.

7. The drive assembly of claim 5, further comprising a user interface adapted to actuate the means for moving the axially movable member.

8. The drive assembly of claim 7, wherein the user interface is a finger lever.

9. A drive assembly comprising:

a rotatable drive shaft;

a ground-engageable wheel mounted on the drive shaft and rotationally decoupled from the drive shaft with the drive shaft extending through the wheel;

a drive transmitting member rotationally coupled to the drive shaft;

a clutch member rotationally coupled to the drive transmitting member and movable relative to the drive transmitting member, wherein the drive shaft extends through the clutch member;

a wheel drive member rotationally coupled to the wheel and adapted to receive a rotational energy from the clutch member, the wheel drive member mounted on the drive shaft and rotationally decoupled from the drive shaft with the drive shaft extending through the wheel drive member;

a drive receiving member mounted on the drive shaft and rotationally decoupled from the drive shaft with the drive shaft extending through the drive receiving member, wherein the drive receiving member is adapted to be engaged with the clutch member and with the wheel drive member to transfer rotational energy form the drive shaft to the wheel and wherein the drive receiving member is adapted to be disengaged form the clutch member to substantially prevent transfer of rotational energy form the drive shaft to the wheel;

means of biasing the clutch member toward a position in which the clutch member transfers rotational energy to the wheel drive member;

means of moving the clutch member axially relative to the drive shaft, wherein the means of moving the clutch member is a lever; and a device adapted to selectively prevent a disengagement of the clutch member from the drive receiving member.

10. The drive assembly of claim 9, wherein the device comprises teeth on the lever that are adapted to engage the clutch member.

11. The drive assembly of claim 10, wherein the device further includes a movable lock adapted to selectively prevent a movement of the lever when the clutch member is engaged with the drive receiving member.

12. The drive assembly of claim 11, wherein the comprising a user interface for controlling the movement of the movable lock.

13. The drive assembly of claim 12, wherein the user interface is a finger lever.

14. The drive assembly of claim 9, wherein the device comprises a movable lock adapted to selectively prevent a movement of the lever when the clutch member is engaged with the drive receiving member.

* * * * *

UNITED STATES PATENT AND TRADEMARK OFFICE
CERTIFICATE OF CORRECTION

PATENT NO. : 6,968,933 B2 Page 1 of 1
DATED : November 29, 2005
INVENTOR(S) : Buschouse et al.

It is certified that error appears in the above-identified patent and that said Letters Patent is hereby corrected as shown below:

Column 3,
Lines 12, 14 and 16, delete "form" and insert -- from --.

Signed and Sealed this

Eleventh Day of April, 2006

JON W. DUDAS
*Director of the United States Patent and Trademark Office*